United States Patent [19]

Kogane

[11] Patent Number: 4,908,657
[45] Date of Patent: Mar. 13, 1990

[54] BOUNDARY DISPLAY DEVICE FOR DIVISION-PRINTING

[75] Inventor: Mikio Kogane, Tokyo, Japan

[73] Assignee: Fuji Photo Film Co., Ltd., Kanagawa, Japan

[21] Appl. No.: 305,044

[22] Filed: Feb. 2, 1989

[30] Foreign Application Priority Data

Feb. 10, 1988 [JP] Japan .................................. 63-29492

[51] Int. Cl.$^4$ ............................................. G03B 27/62
[52] U.S. Cl. ........................................ 355/75; 355/54
[58] Field of Search ..................................... 355/75, 54

[56] References Cited

U.S. PATENT DOCUMENTS

| | | | |
|---|---|---|---|
| 3,591,284 | 7/1971 | Liebman | 355/75 |
| 3,661,449 | 5/1972 | Wright | 355/54 |
| 4,247,198 | 1/1981 | Beyrenther | 355/54 |
| 4,506,976 | 3/1985 | Kiejzik | 355/54 |

Primary Examiner—Monroe H. Hayes
Attorney, Agent, or Firm—Sughrue, Mion, Zinn, Macpeak & Seas

[57] ABSTRACT

A boundary display device is used in a photographic printer performing so-called division-printing by which partial prints are produced from an image frame of a negative film to construct a composite greatly-enlarged print. The boundary display device comprises a transparent plate and lines which represent the boundaries of areas into which a scene of a film frame is nominally divided. The transparent plate is placed in an opening of a film carrier of the printer so as to view how the scene is divided prior to the division-printing. Based on the viewing, the position of the film in the opening is moved slightly if necessary.

7 Claims, 3 Drawing Sheets

BOUNDARY DISPLAY DEVICE FOR DIVISION-PRINTING

BACKGROUND OF THE INVENTION

The present invention relates to a boundary display device used in a photographic printer which makes a plurality of enlarged partial prints from one image frame on a developed photographic film.

There has been proposed a method of division-printing in which instead of making a single greatly-enlarged print from an original image on the developed photographic film, a plurality of enlarged partial prints are made from the original image and thereafter arranged, according to their corresponding positions of the original image, on a display panel or sheet to display a large composite picture (for example, U.S. patent application. Ser. No. 169,790). This large composite picture display has the effect as if the partial prints arranged in this way were a single greatly-enlarged print, resulting in reduced printing costs in comparison with making the single greatly-enlarged print. The developed photographic film for making the partial prints was then returned to the customer from a photofinishing laboratory together with prints produced from the film in the form of several film strips and again sent to the photofinishing laboratory to make partial prints for the film frames specified by the customer. When the partial prints are then made, a film strip held in a film carrier of the printer is two-dimensionally shifted in a plane perpendicular to the printing optical axis of the printer to nominally divide the image frame of the film strip.

In this method, however, it is impossible to know prior to the division-printing how a scene of an image frame is divided. Hence, an undesirable large composite picture is sometimes produced. For example, a person's eye in a portrait may be separately printed on two or four partial prints adjacent to one another. In this case, a line or lines may run through the person's eye when the partial prints are arranged without space between adjacent partial prints, or the person's eye is separated into two parts on two adjacent partial prints when they are arranged with some space therebetween.

It is therefore an object of the present invention to provide a boundary display device which makes it possible to view, prior to division printing, how the scene of an image frame will be divided.

SUMMARY OF THE INVENTION

To achieve this and other objects and advantages, a boundary display device according to the present invention comprises a transparent plate which is placed in an exposure opening of a film carrier of a photographic printer. Further, lines are provided on the surface of the transparent plate so as to view how a scene on one image frame of a film strip is divided. When viewing the division, the transparent plate is placed just on or close to the film strip. If it is judged that the scene of the image frame will be undesirably divided, the photographic film strip is moved on the film carrier or the home position of the film carrier is shifted. After viewing the division, the transparent plate is moved away from the exposure opening so as not to disturb the division-printing. By using the boundary display device according to the present invention, it is possible to avoid undesirable and unnatural prints. The simply constructed boundary display device is easy to operate and handle. Further, according to the preferred embodiments, the transparent plate is pivotably or slidably fitted to the film carrier. Therefore, the division is quickly performed and it is easy to retain and handle the transparent plate, preventing it from being lost.

BRIEF DESCRIPTION OF THE DRAWINGS

These and other objects and features of the invention will be seen by reference to the following description, taken in connection with the accompanying drawing in which.

DETAILED DESCRIPTION OF THE INVENTION

Figure 1:
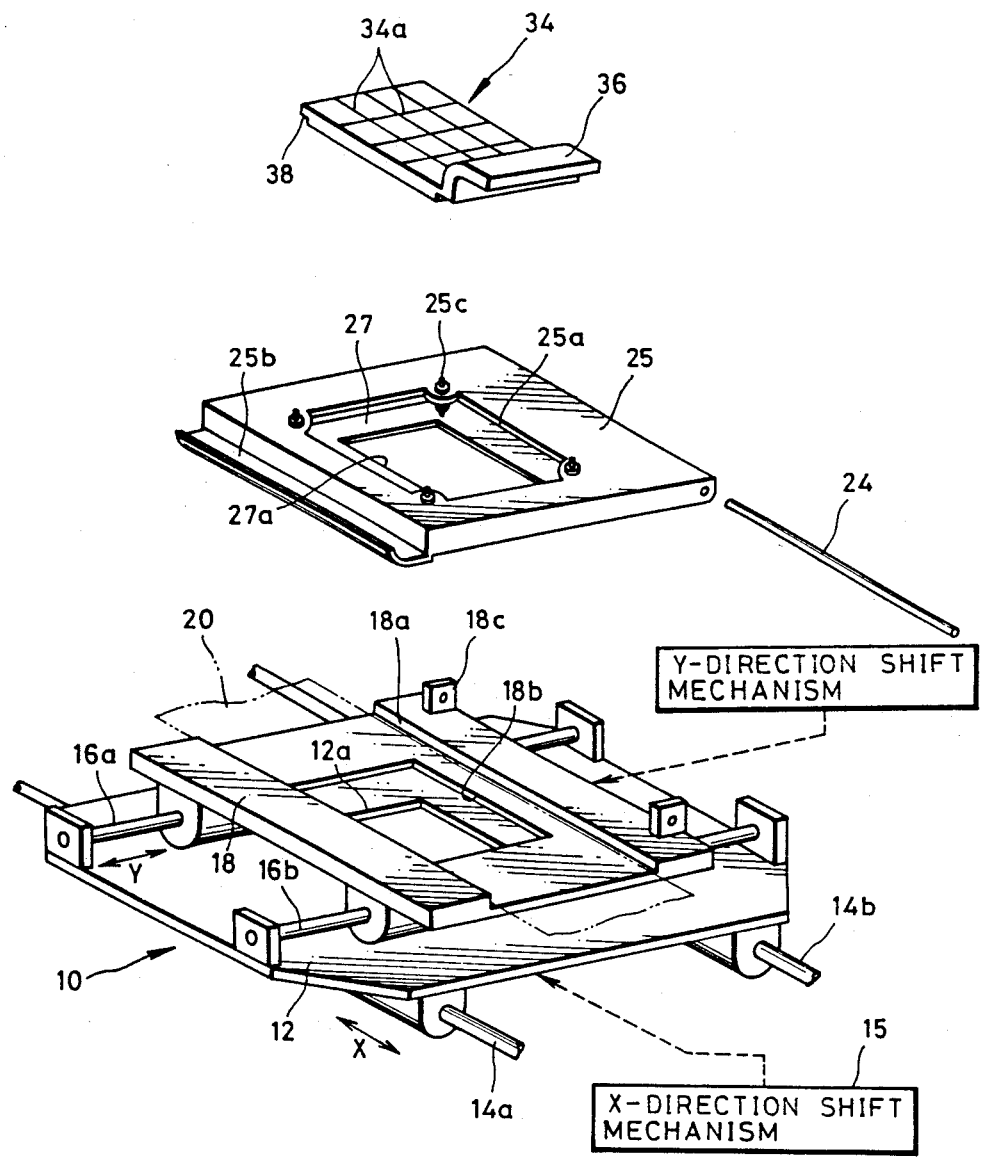
FIG. 1 is an exploded perspective view of a film carrier to which the first embodiment of a boundary display device according to the present invention is mounted.
Figure 2:
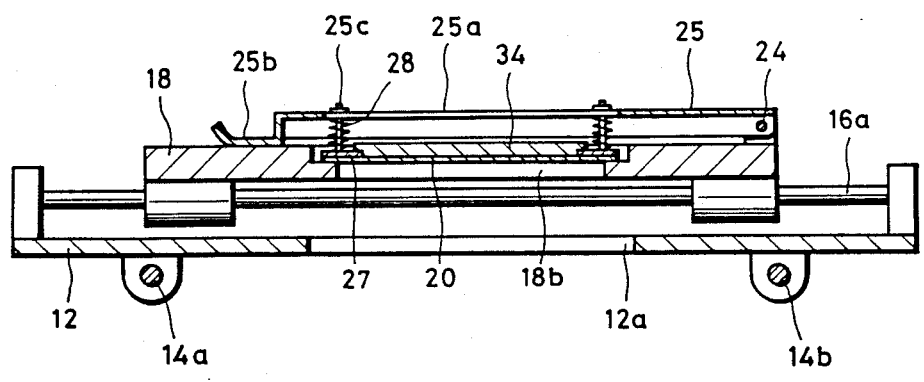
FIG. 2 is a cross-sectional view of the film carrier of FIG. 1, when the boundary display device is in use.

Referring now to the drawings, wherein like reference characters designate like or corresponding parts throughout FIGS. 1 to 5, FIGS. 1 and 2 show a film carrier 10 using a boundary display device of the first embodiment according to the present invention. The film carrier 10 is mainly provided with a slide table 12, a film holder 18, and a mask holder 25 and is movably supported on a fixed frame (not shown) on a photographic printer so that a film frame is disposed in the printing optical path of the printer. The slide table 12 has an opening 12a through which printing light from a light source unit (not shown) disposed under the opening 12a passes. This slide table 12 is supported with a pair of guide rods 14a and 14b and is slidable stepwise back and forth along an axis (which is hereinafter referred to as the X-axis) by a predetermined amount with a X-axis shift mechanism 15. Another pair of guide rods 16a and 16b are provided on the slide table 12 for supporting the film holder 18 which holds a film strip 20 in a film path 18a consisting of a wide groove. The film strip 20, having six image frames, is made by cutting a developed negative film. In the middle of the film strip path 18a, an opening 18b for passing the printing light, analogous to the opening 12a, is defined. The film holder 18, supported with the pair of guide rods 16a and 16b, is shifted stepwise back and forth along another axis (which is hereinafter referred to as the Y-axis) perpendicular to the X-axis by a predetermined amount with a Y-axis shift mechanism 22.

The X- and Y-axis shift mechanisms 15 and 22 comprise, respectively, a pulse motor, a feed screw driven by the pulse motor, and a motor controller controlling the number of steps of rotation of the pulse motor according to the size of the film frame and the number of the areas of a nominally divided film frame in order to place one of the areas just in the optical path of the printing light. Instead of such X- and Y-axis shifting, the film holder 18 may be manually set by providing a grip arm and pins which are fitted into holes defined in a matrix in a plate provided independent of the film holder 18 and the slide table 12.

The mask holder 25 holding a mask 27 is pivotably mounted at one side on the film holder 18 by means of a pair of brackets 18c of the film holder 18 and a pivot shaft 24. The mask holder 25 is shaped like a box with its bottom open and has an opening 25a for the printing light in the middle of the top thereof and a leg 25b on a side opposite to the side which is pivotably fitted to the film holder 18. When the division-printing is performed, the mask holder 25 is biased downwardly by a solenoid (not shown) with the leg 25b pressing the top surface of the film holder 18.

The mask 27 is defined with an opening 27a for the printing light and is used for pressing the peripheries of a film frame to keep the film strip 20 flat. The mask 27 also restricts the size of the film frame by blocking the printing light. Four pins 25c are provided in the corners of the mask 27 which are inserted into holes of the mask holder 25 and secured with E-rings at their leading ends. Four springs 28 are provided on the respective pins 25c for pressing the mask 27 downwardly.

Before performing the division-printing, a boundary display device comprising a transparent plate 34 is used to view how the scene of the image frame is divided. The transparent plate 34 is made of plastic or glass and has dividing lines 34a on its top surface. The dividing lines may be provided on the bottom surface to completely eliminate the difference due to parallax. As will be seen from FIG. 1, the dividing lines 34a consist of two groups of parallel lines, one group is a plurality of horizontal lines, and the other group is a plurality of vertical lines. A grip 36 extending upwardly is provided at one end of the transparent plate 34 on the top surface. Further, steps 38 for fitting in the opening 27a of the mask 27 are defined at both ends of the under surface of the plate 34. Since one frame of a film strip is divided into four columns and four rows, the number of lines in each group is three. It should be noted that one film frame may be divided into, for example, three columns and three rows. In that case, a transparent plate has two vertical lines and two horizontal lines.

Next, the operation of the first embodiment will be explained. Before starting the division-printing, the transparent plate 34 is placed on the mask 27 through the opening 25a of the mask holder 25 by holding the grip 36 so as to observe how a scene is divided. The transparent plate 34 can be precisely placed in its position for use due to the provision of the steps 38 which are fitted in the opening 27a of the mask 27. Then, the nominally-divided scene of an image frame of the negative film strip 20 is viewed through the transparent plate 34 from above the mask holder 25.

Figure 3:
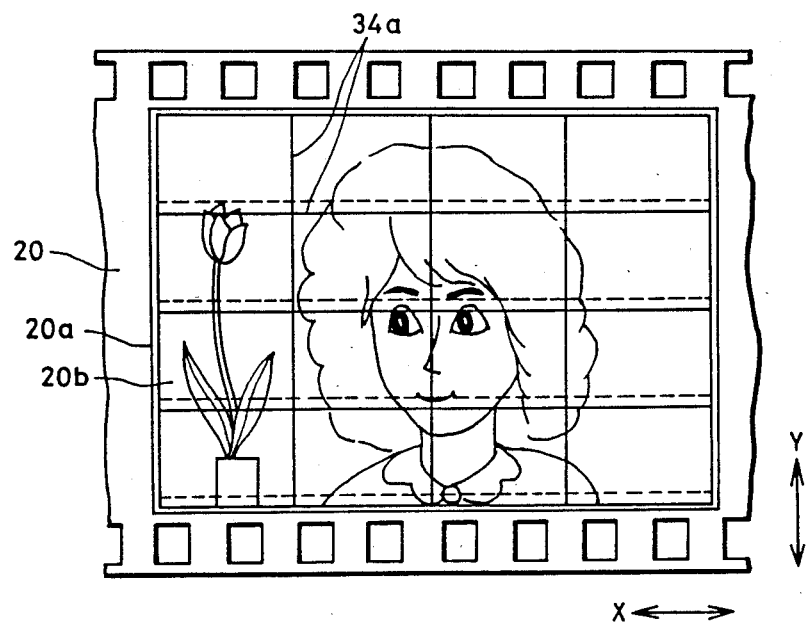
FIG. 3 is an explanatory view showing a film frame of a film strip and division lines on a boundary display device, illustrating how a scene of the film frame will be divided.

The interrelation between a scene of an image frame and the dividing-lines drawn on the transparent plate 34 is illustrated in FIG. 3, in which a positive image is shown for merely explanatory convenience instead of an actual negative image. Occasionally a situation arises where an important part of the scene, for example a person's eye in a portrait, is divided into two parts as shown in FIG. 3, or four parts in the worst case. If partial prints were to be made with the important part divided, the composite large picture gives an unnatural and undesirable impression, especially when the partial prints are arranged with space between the adjacent prints. In FIG. 3, a solid line parallel to the X-axis or a horizontal line runs through both the right and left eyes of a woman, causing the eyes to separate into two parts on adjacent partial prints. In this case, the film strip 20 is moved slightly downwardly in the film path 18a of the film holder 18 so that the line 34a does not run through the eyes, as shown by dotted lines. The film strip can move parallel to the Y-axis in the film path 18a because the width of the film path 18a is made slightly larger than that of the film strip 20. If a line parallel to the Y-axis or a vertical line runs through the one of the eyes, the film strip 20 is shifted slightly along the longitudinal direction of the film holder 18 or parallel to the X-axis.

Though in the above embodiment, the mask holder 25 is pivotably mounted on the film holder 18, the mask holder 25 may be separately secured with another supporting member in the printer. In this case, a transparent glass plate without any lines is placed on the negative film strip 20, preventing the mask holder 25 from falling into the film path 18a. Therefore, the mask holder 25 is not moved together with the shifting of the film holder 18. In order to move the film strip relative to the transparent plate 34 for prevention of undesirable division, a home position adjustment mechanism for the X- and Y-axis shift mechanisms are automatically or manually operated.

After viewing the division of the image and moving the film strip 20 based on the viewing for desirable division if necessary, the transparent plate 34 is removed from the mask by holding the grip 36. Then, through a control board, the division-printing and the X- and Y-axis shift mechanisms are controlled. The slide table 12 is shifted stepwise along the X-axis with the X-axis shift mechanism 15 and the film holder 18 is shifted stepwise along the Y-axis with the Y-axis shift mechanism 22 according to predetermined sequential shifting. At each shifted position, corresponding areas of a film frame are exposed to make a respective partial print. Thus, sixteen enlarged partial prints from an image nominally divided are produced. A composite large print is made by arranging these partial prints on a display panel or a sheet at their positions corresponding to the positions of the areas of the film frame, producing substantially a single greatly-enlarged print.

Figure 4:
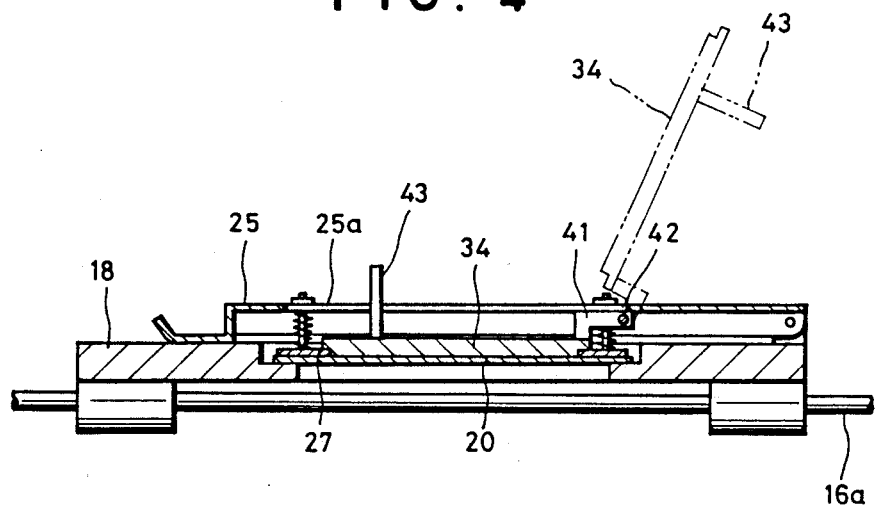
FIG. 4, is a cross-sectional view of a film carrier to which the second embodiment of a boundary display device according to the present invention is pivotably fitted.

FIG. 4 shows the second embodiment of the present invention, in which the boundary display device, namely, the transparent plate 34 with the dividing lines 34a is pivotably fitted to the mask holder 27 at an arm 41 provided on the transparent plate 34 with a pivot shaft 42. In order to view the boundaries of the areas of the nominally divided image, the transparent plate 34 is rotated, from its standby position shown by two-dotted chain lines, counterclockwise in FIG. 4. For the rotation of the transparent plate 34, a pin 43 fitted to the transparent plate 34 is held with the fingers. After viewing, the transparent plate 34 is returned to the standby position shown by dotted lines from the in-use position shown by solid lines, allowing the exposures for division-printing.

Figure 5:
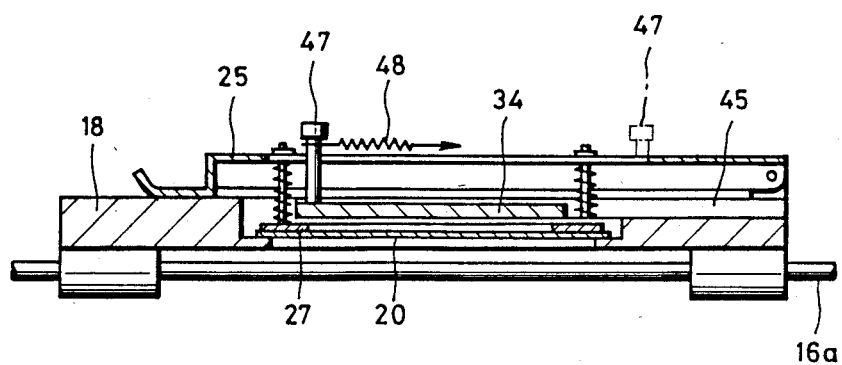
FIG. 5 is a cross-sectional view of a film carrier to which the third embodiment of a boundary display device according to the present invention is slidably fitted.

The third embodiment according to the present invention is shown in FIG. 5, in which the transparent plate 34 with dividing lines is slidably fitted to the mask holder 25. For sliding-movement of the transparent plate 34, a wide groove 45 is defined in the film holder 18. The transparent plate 34 is located at its standby position shown by two-dotted chain lines because of the biasing force of a spring 48 when not in use. When the transparent plate 34 is used, the transparent plate 34 is moved leftwardly along the wide groove 45 to its in-use position shown by solid lines just over the opening 27a of the mask 27, by pushing a pin 47 against the biasing force of the spring 48. At this position, the left side of the transparent plate 34 abuts against the end of the groove 45 to precisely position the transparent plate 34. After the boundaries are viewed, the transparent plate 34 returns to its standby position so as not to disturb the division-printing exposures.

Obviously, many other modifications and variations of the present invention are possible in the light of the above teachings. It is therefore to be understood that within the scope of the claims, the invention may be practiced otherwise than as specifically described.

What is claimed is:

1. A boundary display device for a photographic printer which has a carrier holding an original and performs division-printing in which the original is nominally divided into a plurality of areas to make a plurality of enlarged partial prints from the original, each of enlarged partial prints corresponding to one area of the nominally divided original, and the carrier having an opening for exposure of division-printing, comprising:
   a transparent plate placeable on the original; and
   a plurality of lines provided on said transparent plate which represent boundaries of the areas.

2. A boundary display device as claimed in claim 1, wherein said transparent plate is detachably fitted in the opening.

3. A boundary display device as claimed in claim 2, wherein a gripping means to be held with fingers is provided on one end of said transparent plate so as to place said transparent plate in the opening.

4. A boundary display device as claimed in claim 1, wherein said transparent plate is pivotably provided on the carrier and is movable away from the opening at a standing position so as not to disturb the exposure when the division-printing is performed.

5. A boundary display device as claimed in claim 1, wherein said transparent plate is slidably provided in the carrier and is movable away from the opening so as not to disturb the exposure when the division-printing is performed.

6. A boundary display device as claimed in claim 4 or 5, wherein said transparent plate is provided with a holding means to be held with fingers so as to move said transparent plate.

7. A boundary display device as claimed in claim 1, wherein the carrier comprises a holder for holding the original and being movable back and forth along a first axis, a table slidably supporting the holder and being movable back and forth along a second axis perpendicular to the first axis, and a mask which is provided with the opening to press the original flat.

* * * * *